(12) United States Patent
Benedetti et al.

(10) Patent No.: US 7,204,000 B2
(45) Date of Patent: Apr. 17, 2007

(54) FASTENER FOR FIXED RIB APPLICATIONS

(75) Inventors: Steven M Benedetti, Sterling Heights, MI (US); Rosalind A Nessel, Birmingham, MI (US)

(73) Assignee: Newfrey LLC, Newark, DE (US)

( * ) Notice: Subject to any disclaimer, the term of this patent is extended or adjusted under 35 U.S.C. 154(b) by 144 days.

(21) Appl. No.: 10/684,722

(22) Filed: Oct. 13, 2003

(65) Prior Publication Data

US 2005/0079009 A1 Apr. 14, 2005

(51) Int. Cl.
*A44B 1/04* (2006.01)

(52) U.S. Cl. ............................ 24/295; 24/293; 24/297; 403/329

(58) Field of Classification Search .............. 403/397, 403/DIG. 14, 329, 326; 24/293, 294, 295, 24/296, 297; 248/316.7, 71, 229.16, 229.26; 411/902, 903, 542, 371.1, 508, 509, 913; 296/29, 191, 39.1, 77.1
See application file for complete search history.

(56) References Cited

U.S. PATENT DOCUMENTS

| | | | |
|---|---|---|---|
| 2,171,925 A * | 9/1939 | Fitts ........................... | 411/548 |
| 4,865,505 A * | 9/1989 | Okada ......................... | 411/512 |
| 5,533,237 A * | 7/1996 | Higgins ....................... | 24/289 |
| 5,542,158 A * | 8/1996 | Gronau et al. ................ | 24/295 |
| 5,857,244 A | 1/1999 | Edwards et al. | |
| 5,987,714 A * | 11/1999 | Smith .......................... | 24/295 |
| 6,253,423 B1 * | 7/2001 | Friedrich et al. ............. | 24/293 |
| 6,381,811 B2 * | 5/2002 | Smith et al. .................. | 24/289 |
| 6,497,011 B2 * | 12/2002 | Smith et al. .................. | 24/295 |
| 6,527,471 B2 * | 3/2003 | Smith et al. ................ | 403/291 |
| 6,568,045 B2 * | 5/2003 | Smith .......................... | 24/295 |

FOREIGN PATENT DOCUMENTS

| | | |
|---|---|---|
| DE | 19532360 | 3/1997 |
| EP | 1475273 | 11/2004 |
| FR | 2702720 | 9/1994 |
| WO | WO 03/046393 | 6/2003 |

\* cited by examiner

*Primary Examiner*—Daniel P. Stodola
*Assistant Examiner*—Daniel J. Mills
(74) *Attorney, Agent, or Firm*—Harness, Dickey & Pierce, P.L.C.

(57) ABSTRACT

A fastener joining accessories to automobiles includes a molded portion having a flexible skirt and two support posts extending from the flexible skirt. A metallic portion insert molded with the molded portion includes both a pair of deflection wings and a pair of looped bights oppositely extending from the flexible skirt.

26 Claims, 6 Drawing Sheets

FASTENER FOR FIXED RIB APPLICATIONS

FIELD OF THE INVENTION

The present invention relates generally to fasteners and more specifically to a fastener design for joining trim pieces to the surfaces of automobiles.

BACKGROUND OF THE INVENTION

For automotive applications, fasteners are used to join trim pieces to sections or metal body portions of the automobile. The requirements for these fasteners are that they be insertable into apertures of the automobile and meet standards for both insertion pressure of the insert as well as minimum pullout retention force such that the insert can be removed without damaging the trim piece. Common fastener designs include two or more flexible wings which deflect upon insertion of the fastener and expand by spring force to hold the fastener within an aperture formed in the automobile. A drawback of commonly used fasteners is the inability of the fastener to seal for intrusion of moisture, dust and dirt into the automobile. Another drawback in an all-metal fastener or retainer is that because of the materials used, a plating and/or finish is required to prevent corrosion. Still another drawback of some existing fastener designs is an all metal body of the fastener itself. An all-metal fastener can result in corrosion between the metal contact surfaces of the fastener and the automobile as well as causing damage to the area of the aperture of the automobile upon insertion of the fastener or removal of the fastener.

Some fastener designs have a further drawback by requiring two pieces. In a typical application of a two-piece fastener design, a fastener body or first piece is inserted into an aperture and a second piece is inserted into the first piece to expand the first piece, thus holding the fastener in position. This obviously increases complexity and cost of assembly as well as requiring maintenance of a two part system during vehicle construction.

SUMMARY OF THE INVENTION

According to a preferred embodiment of the present invention, a fastener comprises a first portion having a flexible skirt and at least two support posts distally extending from a first side of the flexible skirt. A second portion is permanently joined with the first portion and has at least two deflection wings extending from the first side of the flexible skirt and at least one substantially U-shaped member freely extending from a second side of the flexible skirt.

According to another aspect of the present invention, a one-piece apparatus for joining accessories to vehicles comprises a polymeric first portion. The polymeric first portion includes a flexible skirt; a pair of support posts; and a bridge connectably joining distal ends of each of the support posts. A metallic second portion includes an end portion partially insert moldable into the bridge, the end portion having a pair of integrally connected metallic deflectable wings, the deflectable wings extendable toward the flexible skirt.

According to still another aspect of the present invention, a fastener system includes a one piece fastener having a metallic portion insert moldable with a moldable portion. The one piece fastener operably joins a trim piece to a body panel of a vehicle. According to yet another aspect of the present invention, a method is provided to form a one-piece fastener for joining automotive trim pieces to an automobile body.

An advantage of the present invention over traditional fasteners includes provision of the polymeric portion that provides flexibility at a seal joint between the fastener and the vehicle or trim piece and reduces the potential for corrosion by eliminating metal-to-metal contact at the seal joint. The present fastener having a metallic portion including deflection members provides spring force for retention of the fastener. The present invention unitary fastener also reduces installation time, effort and cost.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

The following description of the preferred embodiment is merely exemplary in nature and is in no way intended to limit the invention, its application, or uses.

Figure 1:
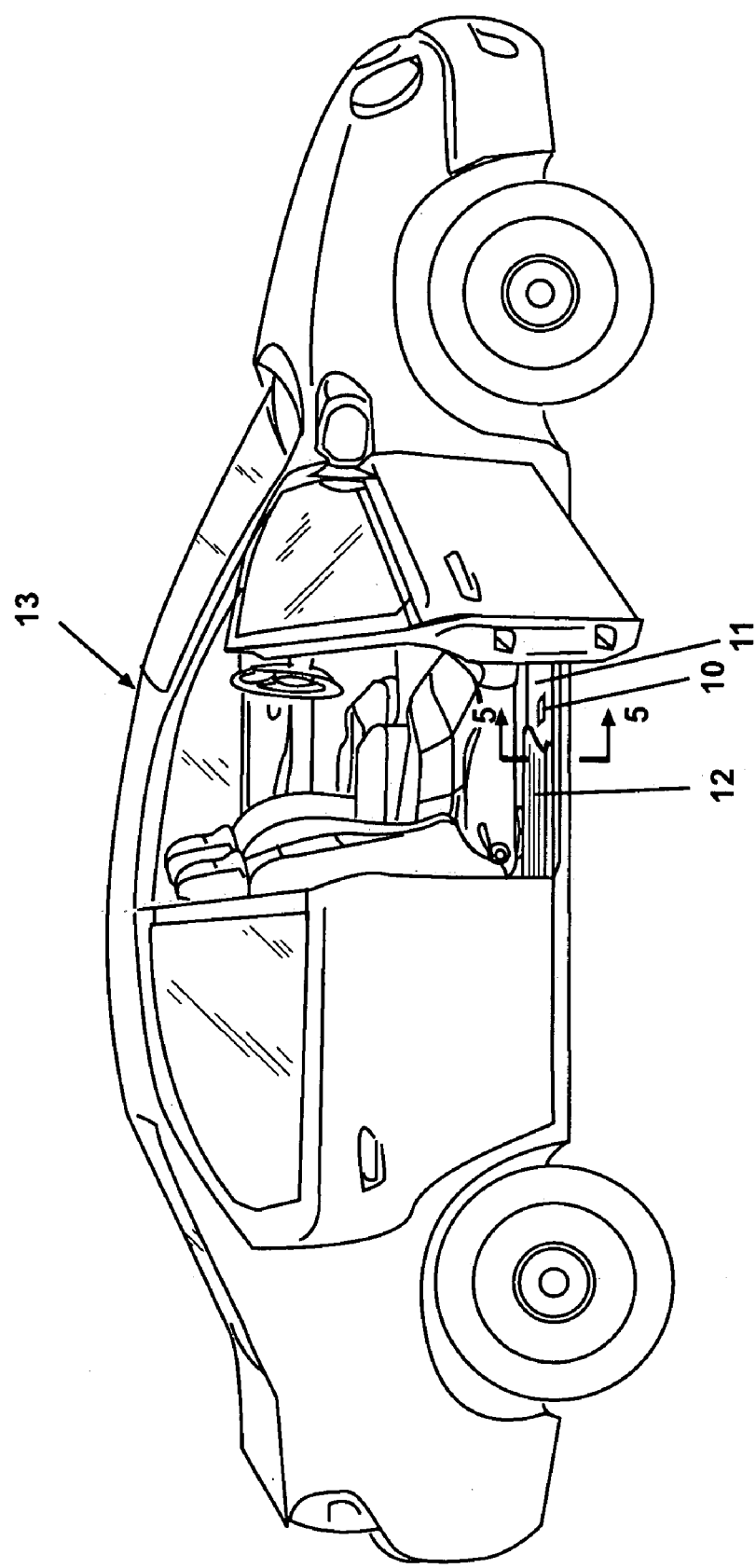
FIG. 1 is a fragmentary perspective view showing the preferred embodiment of an automotive vehicle having a fastener of the present invention.

According to the preferred embodiment of the present invention and as shown in FIG. 1, a fastener 10 is positionable between a rocker panel sill plate 11 and a sill plate molding 12 (or trim piece) to retain the sill plate molding 12 in position adjacent sill plate 11 of an automobile 13. In the embodiment shown in FIG. 1, fastener 10 retains sill plate molding 12 adjacent the floor area or seating compartment of automobile 13. Fastener 10 is not limited to an application for installation of sill plate moldings to sill plates, but can be used for any application of a trim or molding piece to automobile 13 or a vehicle.

Figure 2:
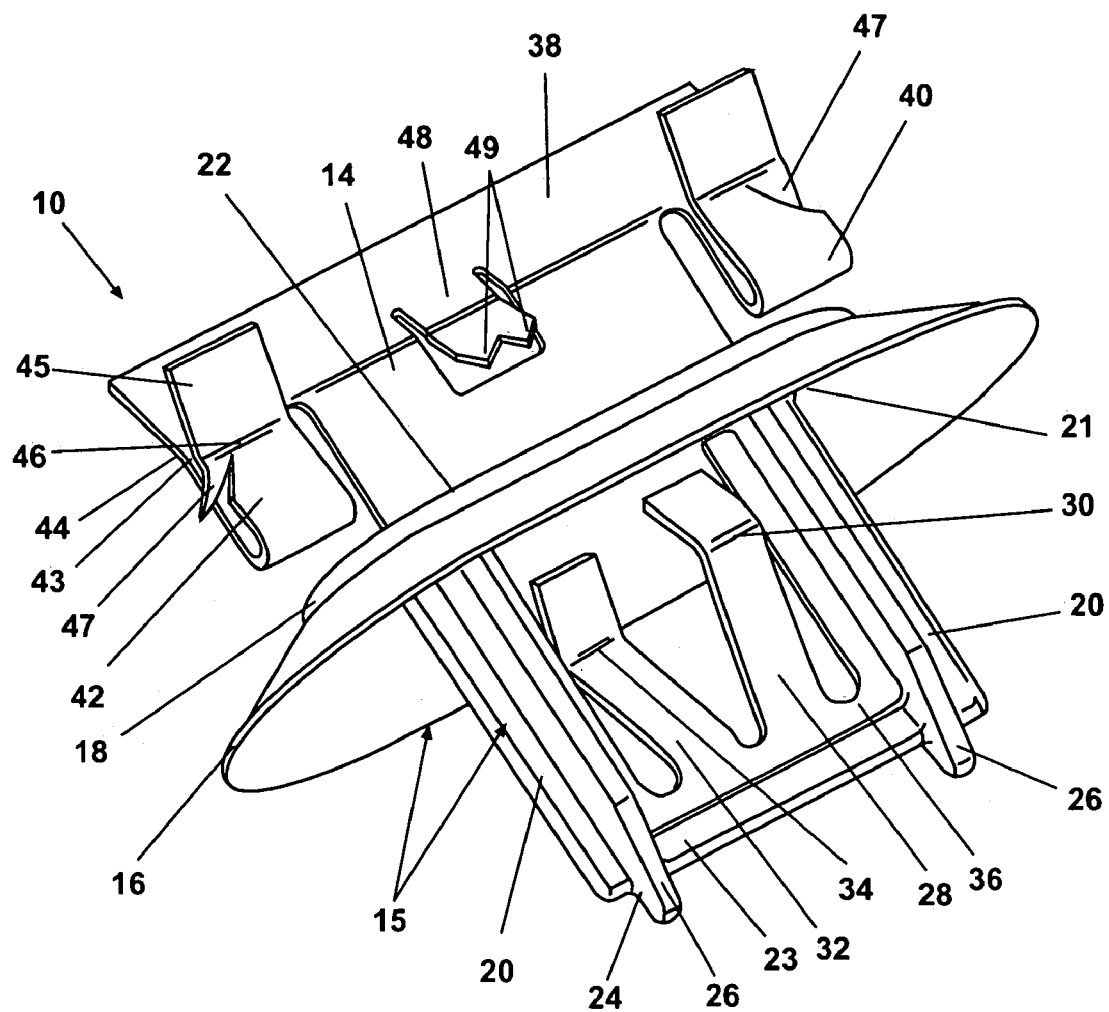
FIG. 2 is a perspective view of a fastener according to the preferred embodiment of the present invention.

Referring to FIG. 2, fastener 10 includes a metallic portion 14 which is insert molded with a molded portion 15. Insert molding, as referred to herein, includes insertion of the metallic portion 14 into a mold (not shown) which is then injected with the polymeric material of the molded portion 15. Metallic portion 14 is preferably pre-formed, for example by stamping, prior to insertion into the mold. Metallic portion 14 can be formed from a plurality of metals. Stainless steel is the preferred metal. Molded portion 15 is preferably formed from a polymeric material selected for its corrosion resistance, flexibility in adapting to a surface area of automobile 13, and its ability to limit contact damage to automobile 13 (shown in FIG. 1) during installation of fastener 10. Polyamide (e.g., nylon) is the preferred material for molded portion 15, however, other polymeric materials or composite materials can be substituted for polyamide. Molded portion 15 further includes a flexible skirt 16, a raised surface 18 of flexible skirt 16, and a pair of support posts 20. Support posts 20 are insert moldable with and extend from a flexible skirt first side 21. Raised surface 18 is positioned on a flexible skirt second side 22.

Molded portion 15 also includes a bridge 23 transversely joining distal ends of each support post 20. A protective guard portion 24 is provided at distal ends of each of the support posts 20. Protective guard portion 24 is also provided with at least one bevel 26 formable at the distal end of each support post 20. The purpose of bevel 26 will be described in greater detail in reference to FIG. 3.

Metallic portion 14 includes a first wing 28 having a bend 30, and a second wing 32 having a bend 34, both wings joined to a lower plate portion 36. Bend 30 and bend 34 are positioned to generally oppose each other such that first wing 28 and second wing 32 are positioned in a non-deflected condition toward opposite sides of support posts 20. This is shown and described in better detail in reference to FIG. 5. Plate portion 36 is partially molded into bridge 23. Distal ends of each of first wing 28 and second wing 32 are freely deflectable.

Metallic portion 14 also includes an upper plate portion 38 extending from raised surface 18 on flexible skirt second side 22. Upper plate portion 38 includes at least one and preferably a pair of U-shaped members. In the embodiment shown, upper plate portion 38 includes a U-shaped member 40 and U-shaped member 42, respectively. Each U-shaped member 40, 42 includes a bite area 43 formed between an upper extension bend 44 of upper plate portion 38 and an upper extension wing 45 having a wing extension bend 46. At least one barb 47 is formed in each U-shaped member 40, 42. Optionally, a wing 48 having one or more barbs 49 is located between U-shaped members 40 and 42, respectfully. Each barb 49 is angled to oppose barbs 47. The purpose for bite areas 43 and barbs 47 and 49 will be described in better detail in reference to FIG. 5.

Figure 3:
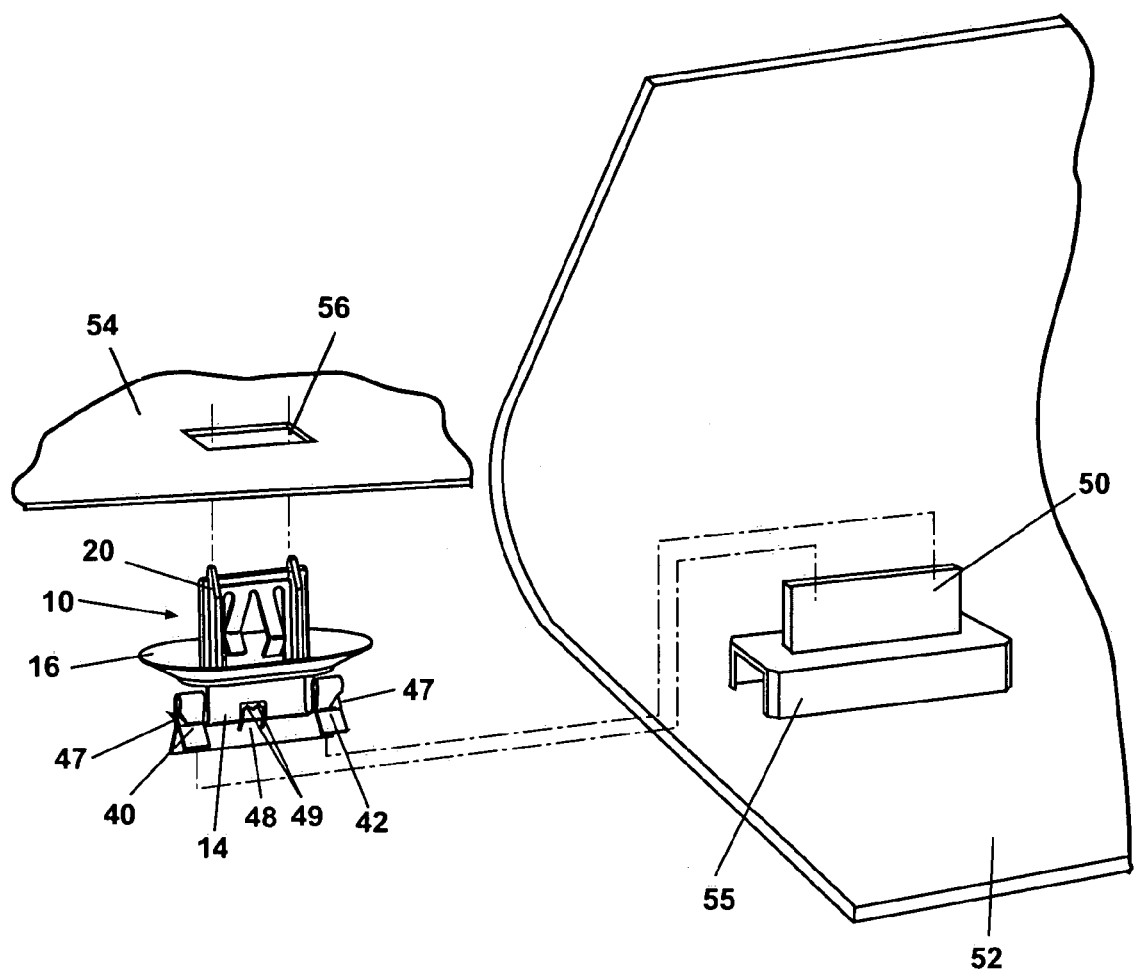
FIG. 3 is an exploded perspective view of the fastener and vehicle.

Referring next to FIG. 3, fastener 10 is shown in alignment prior to installation between a fixed rib 50 of a sill plate molding 52 and a sill plate 54. Sill plate molding 52 is commonly formed by molding from a polymeric material. Fixed rib 50 can be directly molded to sill plate molding 52, or as shown in FIG. 3, can be molded on an intermediate positioned doghouse 55 molded with sill plate molding 52 as known in the art. A plurality of fixed ribs 50 is provided on sill plate molding 52, each provided to engage with one fastener 10.

In a typical installation sequence, fastener 10 is aligned such that U-shaped member 40 and U-shaped member 42 engage with fixed rib 50. The combination of fastener 10 and sill plate molding 52 is then brought into alignment with sill plate 54 having a plurality of rectangular shaped apertures 56 in predetermined locations to co-align with each fixed rib 50 and each fastener 10. The combination of sill plate molding 52 and fastener 10 is engaged with sill plate 54 such that support posts 20 of each fastener 10 slide within one of the rectangular shaped apertures 56 until flexible skirt 16 engages sill plate 54.

Figure 4:
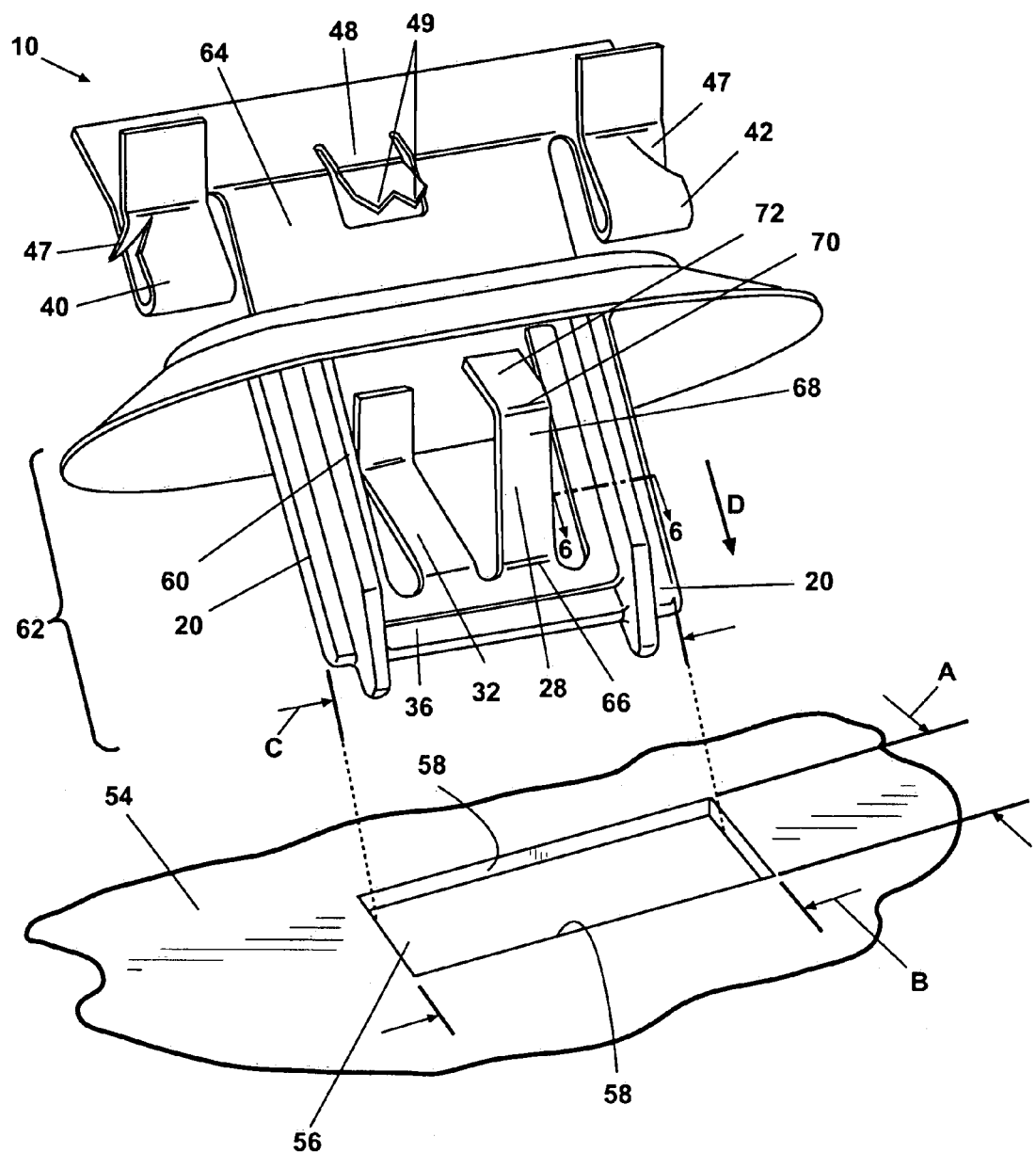
FIG. 4 is an exploded perspective view of the fastener of the present invention.

As best seen in FIG. 4, further details of fastener 10 and rectangular shaped aperture 56 are shown. Rectangular shaped aperture 56 includes aperture edges 58 spaced apart by an aperture width "A". An aperture length "B" is sized to accept a support post width "C" of fastener 10.

A central body portion 60 of metallic portion 14 is integrally joined with plate portion 36 and both first wing 28 and second wing 32 to form a first end 62 of metallic portion 14 facing toward flexible skirt first side 21. A second end 64 of metallic portion 14 faces toward flexible skirt second side 22 (shown in FIG. 2).

First wing 28 also includes a first lower bend 66 separating first wing 28 from plate portion 36. A deflection wing body 68 is formed between first lower bend 66 and a second bend 70 formed in first wing 28. Second bend 70 redirects a deflection wing displaceable end 72 toward a fastener central plane "E" (shown and described in reference to FIG. 5). Second wing 32 includes a similar set of first lower bend 66, deflection wing body 68, second bend 70 and deflection wing displaceable end 72, with the difference that deflection wing displaceable end 72 of second wing 32 is oriented in an opposite facing direction from deflection displaceable end 72 of first wing 28. When support posts 20 are moved in insertion direction "D", second bend 70 of both first wing 28 and second wing 32 contact aperture edges 58, deflecting both first wing 28 and second wing 32 inwardly (towards each other). As previously noted, support posts 20 reach a fully inserted position upon contact between flexible skirt 16 and sill plate 54.

Figure 5:
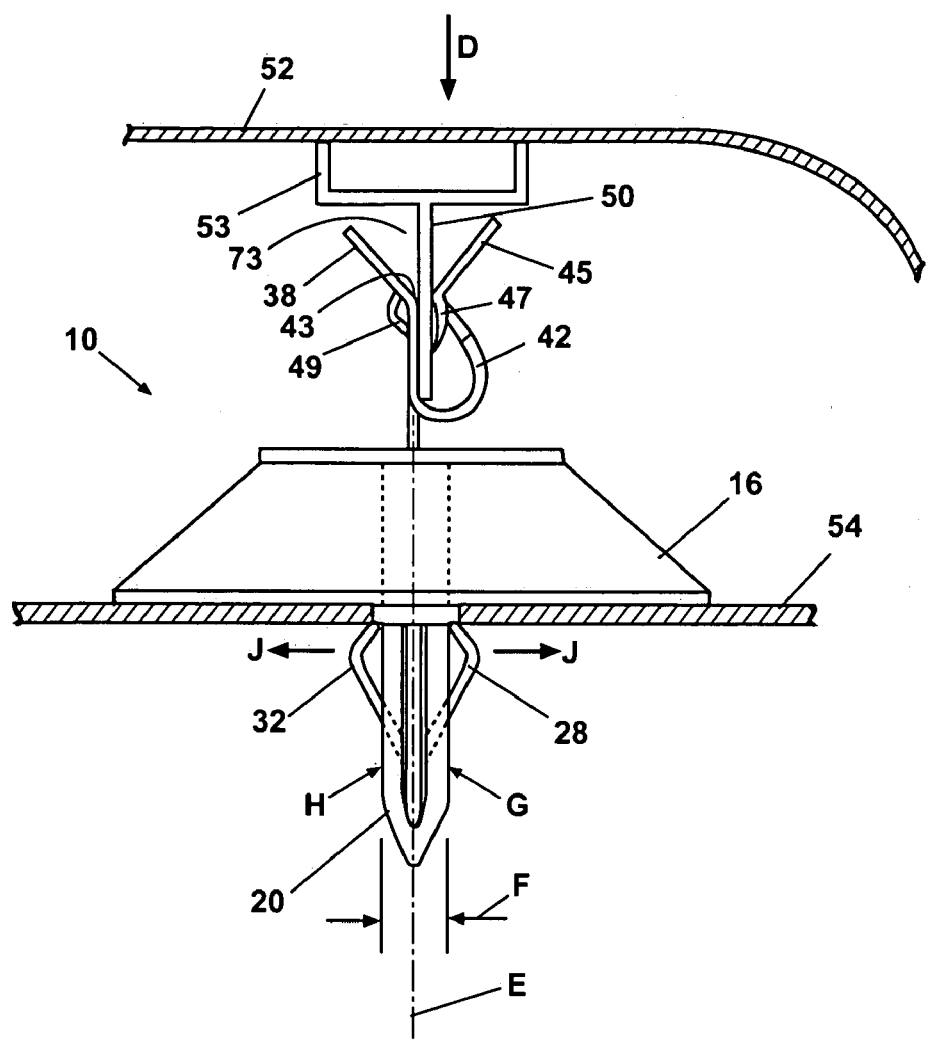
FIG. 5 is a partially sectioned side elevational view of a completed installation between the fastener of the present invention and vehicle.

Referring now to FIG. 5, a completed installation of fastener 10 is shown having flexible skirt 16 in contact with sill plate 54 and fixed rib 50 fully inserted within U-shaped member 42 (U-shaped member 40 is not visible in this view) such that fixed rib 50 is engaged within bite area 43. Fixed rib 50 enters an open end 73 formed between upper plate portion 38 and upper extension wing 45. As previously noted, fixed rib 50 is fully inserted within both U-shaped member 40 and U-shaped member 42 (only U-shaped member 40 is shown in FIG. 5) until fixed rib 50 is engaged within bite areas 43. Fixed rib 50 is held within bite area 43 between upper plate portion 38 and upper extension wing 45. Each barb 47 and the one or more barbs 49 engage opposite faces of fixed rib 50 to help retain fixed rib 50 within U-shaped member 40.

As also seen in FIG. 5, first wing 28 and second wing 32 are oppositely disposed about fastener central plane "E" such that deflection wing body 68 and second bend 70 of both first wing 28 and second wing 32 extend beyond a support post depth "F". First wing 28 is shown located adjacent to a first side "G" of fastener central plane "E" and second wing 32 is shown adjacent to a second side "H" of fastener central plane "E". Upon reaching the fully inserted position shown in FIG. 5, first wing 28 and second wing 32 are both fully extended in the direction of wing expansion arrows "J" and their spring force acts to retain fastener 10. Fastener 10 is thereby held in releasable engagement in each rectangular shaped aperture 56 of sill plate 54.

Figure 6:
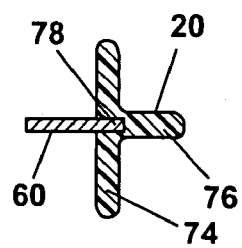
FIG. 6 is a cross-sectional view taken at section 6—6 of FIG. 4 showing an insert molded central body portion and support post of the fastener of the present invention.

Referring next to FIG. 6, in the preferred embodiment each support post 20 includes a flange 74, and an outer web 76 positioned substantially perpendicular to flange 74. Each of flange 74 and outer web 76 are insert molded of polymeric material. Central body portion 60 (described in reference to FIG. 4) includes a metal edge 78 insert molded in contact with flange 74 of each support post 20. A depth of insertion of metal edge 78 within flange 74 is selectable at the time of manufacture and depending upon the design parameters chosen for fastener 10.

Figure 7:
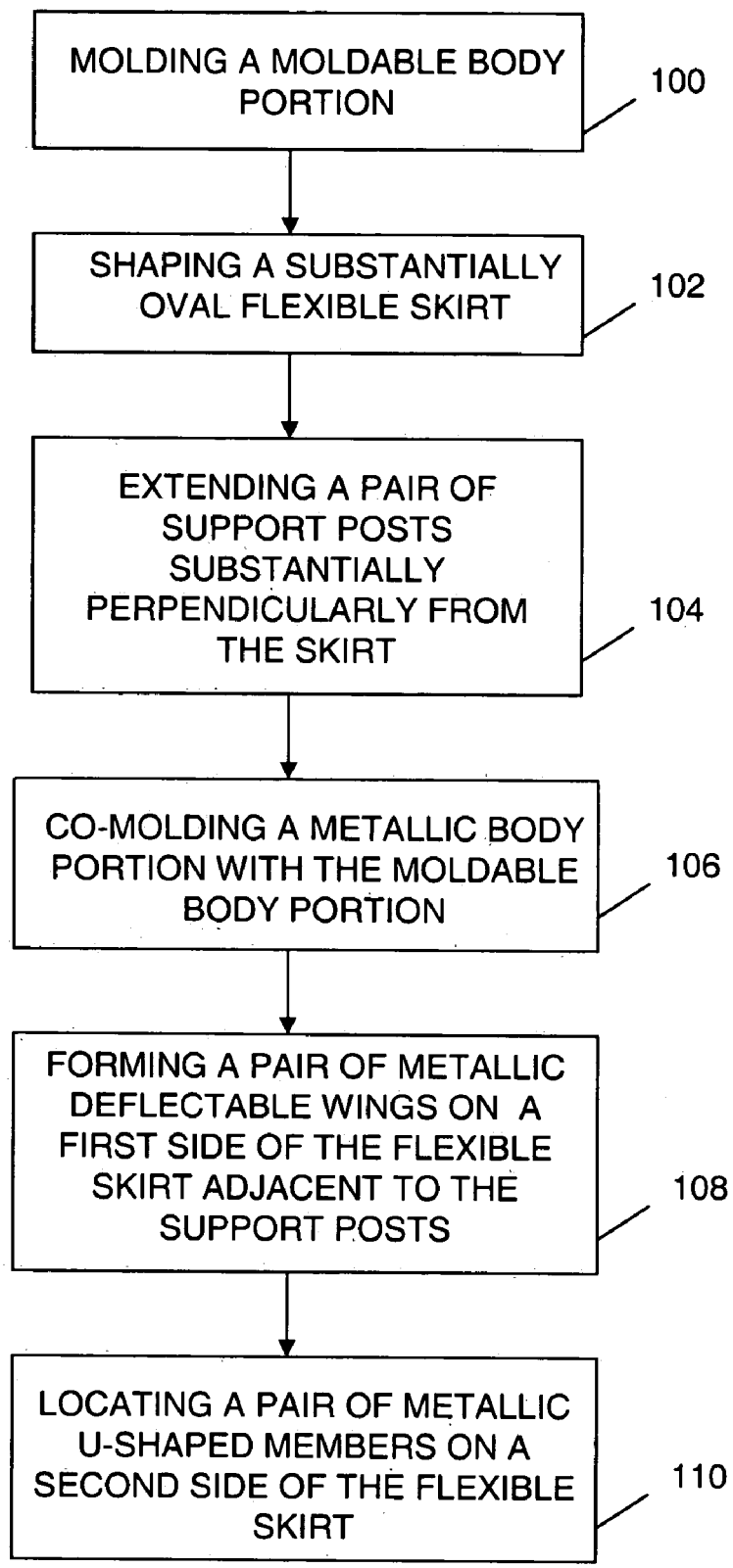
FIG. 7 is a flow diagram identifying the steps for forming a fastener of the present invention.

Referring to FIG. 7, the steps to form a fastener to join trim pieces to an automobile include a step 100 wherein a moldable body portion is molded. In a step 102 a substantially oval flexible skirt is shaped. In step 104, a pair of support posts is extended substantially perpendicular from the flexible skirt. In a next step 106, a metallic body portion is insert molded with the moldable body portion. In a following step 108, a pair of metallic deflectable wings is formed on a first side of the flexible skirt adjacent to the support posts. In a final step 110, a pair of metallic U-shaped members are located on a second side of the flexible skirt.

A fastener of the present invention is generally formed from a combination of polymeric material molded to form the flexible skirt and support posts, and a metallic portion insert molded with the polymeric portion. The metallic portion can also include spring steel, or any metal or alloy of metals formable in the shape of the metal component portion which can retain the spring force necessary to grip a fixed rib of a trim piece and an aperture formed within a vehicle preferably without yielding. A fastener insertion pressure of less than 15 pounds is desirable. It is even more preferable that materials and material thicknesses be selected such that the fastener insertion pressure is retained at or below 10 pounds. A fastener removal pressure of at least 35 pounds is desirable. The fastener of the present invention is intended to be used as a releasable fastener such that trim pieces or other molded component parts can be both installed and/or removed from a vehicle.

A fastener of the present invention offers several advantages. By combining both a metal portion with a polymeric molded portion a simplified one-piece fastener results. The polymeric portion reduces corrosion and physical damage potential at fastener contact locations of vehicle. The metallic portion is deflectable to control both insertion and removal forces. A one-piece insert moldable fastener reduces installation time as well as part storage requirements. A fastener of the present invention is also adaptable for use with existing fixed ribs known in the art, including those attached to doghouse assemblies.

The description of the invention is merely exemplary in nature and, thus, variations that do not depart from the gist of the invention are intended to be within the scope of the invention. For example, U-shaped members 40 and 42 can be re-oriented from those shown in FIG. 2, including rotation through approximately 90 degrees from that shown, or the U-shaped members can be positioned with bight areas facing transverse to plane "D" shown in FIG. 5. The pair of U-shaped members can also be replaced with a greater quantity of U-shaped members. Although two wings, 28 and 32 are shown and described herein, three or more wings can also be used. Fasteners of the present invention are not limited to use for sill plate moldings, but can also be used to join other trim pieces or moldings to a vehicle. Such variations are not to be regarded as a departure from the spirit and scope of the invention. Other materials and shapes may be employed to form fasteners of the present invention, although all of the preferred advantages may not be realized.

What is claimed is:

1. A fastener comprising:
   a polymeric first portion having a flexible skirt and at least two support posts distally extending from a first side of the flexible skirt; and
   a metal second portion including a single central body portion defining a plane having an edge partially embedded in the support posts to non-releasably connect the second to the first portion, the second portion having at least two deflection wings extending from the central body portion and entirely free from the first portion on the first side of the flexible skirt and oppositely extending about the plane, and at least one substantially U-shaped member freely extending from a second side of the flexible skirt.

2. The fastener of claim 1, wherein each deflection wing comprises:
   a fixed end integrally joined to a distal end of the second portion; and
   a displaceable end;
   wherein the displaceable end of a first one of the deflection wings is spatially separable from the displaceable end of a second one of the deflection wings.

3. The fastener of claim 2, wherein each deflection wing comprises:
   a first bend adjacent the distal end of the second portion;
   a deflection wing body angularly directable by the first bend away from a plane formed in parallel with the distal end of the second portion; and
   a second bend located at a junction between the deflection wing body and the displaceable end, the second bend angularly directing the displaceable end toward the support posts.

4. The fastener of claim 3, comprising:
   the first one of the deflection wings being positionable on a first side of the plane formed in parallel with the distal end of the second portion; and
   the second one of the deflection wings being positionable on a second side of the plane formed in parallel with the distal end of the second portion.

5. The fastener of claim 2, comprising a plate portion adjacent the distal end of the second portion, the plate portion operable to integrally support the fixed end of each deflection wing.

6. The fastener of claim 5, comprising a bridge transversely joining a distal end of each of the support posts, the plate portion partially and fixedly received within the bridge.

7. The fastener of claim 1, wherein each of the distal ends of the support posts comprise a beveled end.

8. The fastener of claim 1, wherein each U-shaped member comprises at least one toothed retention element.

9. The fastener of claim 1, wherein each support post further comprises:
   a flange; and
   an outer web homogenously connected to the flange, the outer web oriented substantially perpendicular to the flange and extending outwardly relative to the second portion;
   wherein the edge of the second portion is partially embedded into each of the flange and the outer web.

10. A one-piece apparatus for joining accessories to vehicles, the apparatus comprising:
    a polymeric first portion including:
        a flexible skirt;
        a pair of support posts extending substantially perpendicularly from a side of the skirt, each of the support posts including a flange; and
        a bridge homogenously joining distal ends of each of the support posts; and
    a metallic second portion including a single substantially planar central body portion having an edge partially embedded into the flange of each of the support posts non-releasably connecting the second portion to the flange of the support posts, the second portion further including a pair of integrally connected metallic deflectable wings, the deflectable wings extendable toward the flexible skirt and entirely free from the first portion, the first and second portions defining a unitary insert fastener having the first portion inseparable from the second portion.

11. The apparatus of claim 10, wherein the second portion comprises a head having at least one engagement member.

12. The apparatus of claim 11, wherein the central portion is further integrally joined to the head and extends from the head through the flexible skirt.

13. The apparatus of claim 11, wherein each engagement member comprises:
a substantially U-shaped clip having an open end facing away from the flexible skirt; and
a bight formed between a junction of an opposed pair of clip bends, the bight including at least one barb.

14. The apparatus of claim 10, wherein the polymeric first portion comprises a polyamide material.

15. The apparatus of claim 10, wherein the metallic second portion comprises a stainless steel.

16. A fastener system, comprising:
a vehicle body panel;
a fastener having a metallic portion and a polymeric portion;
at least one U-shaped member of the metallic portion adapted to receive a fixed rib connectably joined to a trim piece;
a pair of support posts extending from the polymeric portion and operably engageable within a substantially rectangular aperture of the body panel; and
an edge of the metallic portion partially embedded into and non-releasably attached to each of the pair of support posts defining a unitary fastener member;
a pair of deflectable wings integrally connected to the second portion, the deflectable wings extendable toward the flexible skirt;
wherein the deflectable wings are oriented entirely free from the first portion and adapted to deflect toward each other upon penetration of the support posts within the aperture and expand away from each other by spring force to releasably engage the fastener with the body panel.

17. The system of claim 16, wherein the at least one U-shaped member comprises a pair of U-shaped members, each having a bight section to releasably engage the trim piece.

18. The system of claim 17, wherein the bight section includes at least one barb.

19. The system of claim 17, comprising a central barb formed between the pair of U-shaped members.

20. The system of claim 16, wherein each of the support posts comprises a beveled end for operable alignment with the rectangular aperture.

21. The system of claim 16, wherein each of the support posts includes a width smaller than a rectangular aperture width permitting an angular rotation of the support posts within the rectangular aperture.

22. The system of claim 16, wherein the polymeric portion includes a flexible skirt operably contacting the vehicle body panel in a fully engaged position of the one piece fastener.

23. The system of claim 16, wherein the fixed rib is homogenously connected to a doghouse assembly, the doghouse assembly being positionable between the fixed rib and the trim piece.

24. The system of claim 16, wherein the deflectable wings operably deflect upon penetration of the support posts within the aperture with an insertion pressure of up to 15 pounds.

25. The system of claim 16, comprising a fastener insertion pressure of at least 10 pounds.

26. The system of claim 16, comprising a minimum fastener removal pressure of 35 pounds.

* * * * *